United States Patent [19]
Richardson et al.

[11] 3,730,272
[45] May 1, 1973

[54] PLUGGING SOLUTION PRECIPITATION TIME CONTROL

[75] Inventors: Edwin A. Richardson, Houston; Ronald F. Scheuerman, Bellaire, both of Tex.

[73] Assignee: Shell Oil Company, New York, N.Y.

[22] Filed: May 17, 1971

[21] Appl. No.: 144,260

[52] U.S. Cl. .................................. 166/294, 166/300
[51] Int. Cl. ...................... E21b 33/13, E21b 43/25
[58] Field of Search ................... 166/294, 292, 300, 166/295, 270

[56] References Cited

UNITED STATES PATENTS

| | | | |
|---|---|---|---|
| 3,378,070 | 4/1968 | Wessler | 166/294 X |
| 3,658,129 | 4/1972 | Lenning | 166/270 |
| 3,614,985 | 10/1971 | Richardson | 166/294 |

*Primary Examiner*—Robert L. Wolfe
*Attorney*—H. W. Coryell and Harold L. Denkler

[57] ABSTRACT

The precipitation time of a plug forming aqueous solution of both a polyvalent metal that precipitates as a gelatinous metal hydroxide and a reactant that raises the pH to cause the precipitation, is controlled, at least in part, by a reaction between nitrite ions and urea.

6 Claims, No Drawings

3,730,272

PLUGGING SOLUTION PRECIPITATION TIME CONTROL

BACKGROUND OF THE INVENTION

This invention relates to a homogeneous solution precipitation type of plugging or gelling agent for producing a relatively immobile gelled fluid and/or a precipitate for reducing the permeability of a permeable material. This invention provides a plugging solution formulation similar to those described in copending patent application, Ser. No. 23,550, filed Mar. 30, 1970 by E. A. Richardson, now U.S. Pat. No. 3,614,985; except for the composition of the pH-increasing reactant.

SUMMARY OF THE INVENTION

This invention provides a precipitate-forming solution which is adapted to maintain its homogeneity and a selected degree of mobility throughout an exposure to a selected combination of time and temperature and then become relatively immobile due to the precipitation of a gelatinous metal hydroxide. The present precipitate-forming solution comprises an aqueous solution of both a polyvalent metal that forms a gelatinous metal hydroxide and a pH-increasing reactant that contains a mixture of nitrite ions and urea.

The present precipitate-forming solutions are useful in numerous well treating and/or fluid diverting or permeable material plugging operations. They are generally useful wherever it is desirable to flow an aqueous solution having a selected mobility into a selected location at which the mobility of the solution becomes significantly reduced. They can be used in treating wells or boreholes: to plug portions of a subterranean reservoir from which, or into which, it is no longer desirable to inject fluids; to plug off an intrusion of water into a gas drilled well borehole; to improve the uniformity of the injection profile of a reservoir interval; to pretreat the borehole of a well in which a casing is to be cemented (by being injected as a slug of fluid that penetrates into large pores, micro fractures and the like and subsequently gels, prior to the injection of a slurry of cement) to enhance the sealing effect of the cement bond; to prevent or control a loss of fluid that is circulated within a well or borehole; etc.

The present invention also provides a permeable region plugging process for increasing the uniformity with which a plugging agent is distributed within a permeable region having a non-uniform permeability. The uniform deposition of plugging material is preferably accomplished by the following steps: Fluid is injected into the permeable region to form a flow stream between the fluid source and the most permeable zone within the region; the precipitate-forming solution of the present invention is included in the flow stream; and the composition of the solution is adjusted (with respect to its metal ion concentration, initial pH, proportion of the nitrite ion and urea components, the temperatures in the permeable region and at a point at which the solution is compounded, and the rate at which the solution is injected into the permeable region) so that the metal hydroxide precipitation occurs in each portion of the injected plugging solution within a selected generally short time after its entry into the permeable region. The mobility of the plugging solution is preferably made substantially equal to that of the remainder of the fluid that forms the flow steam between the fluid source and region being treated.

The above procedure ensures that all or most of the initial portions of the plugging solution flow into the most permeable zones within the region being treated. The most permeable zones may be the most permeable layers or the largest pores that are contained within some or all portions of the region. The first arriving older portions of the plugging solution are displaced by the later arriving younger portions and, as the older portions of the solution begin to gel and become less mobile, their gelation occurs within the more permeable zones. The following younger portions of the plugging solution are thus diverted and, by increasing the injection pressure, are forced into zones of lower permeability. When the younger portions begin to gel, they do so within the zones that initially were the least permeable and, the plugging material is distributed substantially uniformly throughout all of the permeable region.

DESCRIPTION OF THE INVENTION

In the present process, such a correlation of the solution gel time and other factors is feasible because of the relatively rapid low temperature reaction that occurs between the nitrite ions and urea (in the range of concentrations at which they may be present in the plugging solution). Such a reaction is relatively rapid at temperatures in the order of 150°F. This urea/nitrite reaction can be utilized in numerous ways. For example, when the temperature at the location at which the solution is compounded is about 75°F and the temperature in the permeable interval in which a plugging agent is to be distributed is about 150°F, the rate of a hydrolysis of the urea will be too slow to be significant. And, an initial solution pH can be adjusted so that when the solution temperature becomes 150°F, the gelation will be caused by the reaction between nitrite ions and urea, within about 30 minutes. In such a situation, since the rate of the urea/nitrite reaction is approximately doubled with each increase of about 10°F in temperature, its rate at 75° F would be about 1/100 of its rate at 150°F. The gel time of the precipitate-forming solution would be mainly controlled by the time the solution was in the permeable interval at a temperature of 150°F. Alternatively, where the temperature is relatively high in the permeable interval, for example, 190°F, and is a temperature at which the rate of urea hydrolysis is relatively rapid, the proportion of the nitrite ions can be relatively low. This causes the urea-nitrite ion reaction to be completed (with the nitrite ions being used up) while the solution is being heated up to the temperature of the permeable interval and causes the solution pH to be left at a level such that gelation is caused by the urea hydrolysis (at the 190°F temperature) within a selected relatively short time after the solution has reached the permeable interval.

The precipitate-forming systems of the present type are substantially immune to the effects of pressure. This adapts them for well treating uses in which the absolute pressure in the subterranean permeable intervals are relatively high, such as several thousand pounds per square inch. Tests conducted with the aluminia-urea system described in the above-identified copending patent application established that pressure has no appreciable effect and can be ignored. It has similarly been determined that the presence of residual oil in a permeable interval in which a plugging agent is to be deposited exerts little or no adverse effect.

In the precipitate-forming solutions of the present invention, the essential ingredients comprise an aqueous liquid solution of (a) a salt of a polyvalent metal of the specified type, (b) a nitrite salt, and (c) urea. Such solutions can advantageously contain various additional ingredients as long as the latter do not interfere with the above described functions of the above essential ingredients. For example, when a plugging material is to be deposited in a permeable region containing fractures and/or vugs or relatively large pores, The precipitate-forming solutions can advantageously contain a suspension of solid particles, such as crushed sand grains, carbonates, walnut shells, or the like, to cause a passageway-bridging effect and/or to add additional permeability reducing solid material. Where such a permeable zone contains water-sensitive clays, the precipitate-forming solutions can advantageously contain clay-stabilizing materials, such as neutral salts, amines, amine salts, or the like although polyvalent metal salts such as aluminum chloride are, themselves, clay-stabilizing materials. Where desirable, for example in view of a particular distribution of the thicknesses and permeabilities of various layers or pores within a permeable interval, or in view of other needs for a relatively high initial viscosity, the precipitate-forming solutions can contain thickening agents such as partially hydrolyzed polyacrylamides, carboxymethylcellulose, and the like types of water thickening materials.

The polyvalent metal salts used in the present precipitate-forming solutions can comprise substantially any such salt which is soluble in an aqueous solution of relatively low pH and is precipitated as a hydrated metal oxide from an aqueous solution of a moderately higher pH. Such salts are preferably soluble at a pH of from about 2 to 7 and precipitated at from about 7 to 10. The preferred polyvalent metal salts are salts of metals that form gelatinous metal hydroxides or hydrated metal oxides of very low water solubilities. Such metals are typified by aluminum, chromium, iron, copper, bismuth, etc. Such metals are preferably used in the form of salts having relatively high water-solubility in aqueous solutions having a pH of from about 2 to 7, such as the chlorides, nitrates, acetates, or the like.

In addition to a mixture of nitrite ions and urea, the present precipitate-forming solutions can contain a wide variety of pH-adjusting materials. Such materials are inclusive of substantially any water-soluble compound or mixture which reacts within a water solution to produce one or more water-soluble alkaline products that increase the pH of the solution and do not interfere with the pH-increasing reaction between nitrite ions and urea. Suitable materials include water-soluble amides of carbamic acid such ammonium carbamate, carbonic acid halides, urea salts of cyanic acid, such as the alkali metal cyanates, cyanamide, and the like.

The concentration of the polyvalent metal salt and the pH-adjusting reactant can be varied over relatively wide limits. Either of these components can be present in proportions ranging from about 0.1 percent by weight of the aqueous solution to an amount as high as about 30 percent or more that forms a substantially saturated solution. In precipitate-forming solutions containing a relatively low concentration of polyvalent metal salts, the precipitates tend to be discrete particles of gelatinous metal hydroxides, and solutions containing higher concentrations tend to become gels.

Where the pH of an aqueous solution of a particular polyvalent metal salt is relatively low, it can be increased by adding an alkaline material, for example, the pH of an aqueous solution of aluminum chloride is preferably increased (by the addition of a hydroxide, such as an ammonium, sodium and/or potassium hydroxide) to a value of about 4. Potassium cyanate can advantageously be added in order to utilize its relatively rapid hydrolysis at relatively low temperatures to raise the pH of the solution to one from which gellation can readily be induced with a selected time with a relatively low concentration of the urea and nitrite ion reactants.

The nitrite ions can be incorporated in the present plugging solutions in the form of substantially any water-soluble nitrite salt. The alkali metals and ammonium nitrites are generally suitable and the sodium and potassium nitrites are particularly suitable.

The basic nitrite/urea reactions involved in the present invention are as follows:

$$NO_2^- + H_2O = HNO_2 + OH^- \quad (1)$$
$$2 HNO_2 + CO(NH_2)_2 \rightarrow 3 H_2O + 2 N_2 + CO_2 \quad (2)$$
overall $2 NO_2^- + CO(NH_2)_2 \rightarrow H_2O + 2N_2 + CO_2 + 2 OH^- \quad (3)$ As shown in reaction (1), the nitrite ions hydrolyze to produce nitrous acid and hydroxide ions. Nitrous acid in turn reacts with urea to produce $H_2O$, $N_2$, and $CO_2$. As shown in reaction (3), the overall effect is 1:1 replacement of $NO_2^-$ ion by $OH^-$, which results in a pH-increase and produces a gellatinous metal hydroxide.

In the present invention the relatively rapid urea/nitrite reaction provides a means for adapting the precipitate-formation to occur in response to a relatively wide range of times at any of a relatively wide range of temperatures. For example, in order to shorten the delay between the time of mixing and time of gelling at a relatively low temperature, the pH-increasing reactant may comprise a stoichiometric mixture of urea and nitrite iones; and, to lengthen that time, that reactant may contain an excess of urea so that part of the pH-increasing will depend upon the hydrolysis of urea, which is relatively slow at a relatively low temperature. In addition, the delay time decreases with increases in the concentration of polyvalent metal and, for example, precipitations within about 30 minutes at 130°F can be attained with a one molar solution of aluminum chloride.

EXAMPLES

As indicated in the following examples, various tests have been conducted in order to evaluate various aspects of the present process and to compare the present precipitate-forming solution formulations with those described in the above-identified copending patent application. In the following examples, in each system tested, the polyvalent metal which was used was aluminum in the form of aluminum chloride.

As described in the above-identified copending patent application, the hydrolysis of urea in a dilute (<0.1M) aluminum chloride solution produces a fine precipitate of hydrated alumina. At higher aluminum concentrations, a soft alumina gel is produced. The gel is formed when the molar concentration ratio ($R$) of base to aluminum is about 2.4. In practice, the system $R$ ratio is initially adjusted to the range $R_i = 2.0 - 2.3$ with NaOH or KOH and sufficient urea added to cause gel formation upon subsequent urea hydrolysis. The gel time is adjusted by the initial $R_i$ value and urea concentration. The effect of $R_i$ on the gel time is typified by the behavior at 190°F and 200°F of a 0.5M $Al^{+3}$ solution with a urea/$Al^{+3}$ ratio ($R_u$) or $R_u = 2.0$. In this system, the alumina colloid is stabilized by adsorbed positively charged hydrogen ions, $H^+$. The difference between $R = 2.4$ (the gel-initiating $R$ value) and the $R_i$ value is a measure of the excess $H^+$ ion that must be neutralized by urea hydrolysis. Decreasing the $R_i$ results in increased gel times.

There is a limit to the gel time that can be obtained by increasing $R_i$. At $R_i$ values greater than about 2.35, gel times accelerate rapidly and practical control of the system is lost. An additional upper limit on $R_i$ results from problems in mixing high $R_i$ solutions. When $NH_4OH$ or $KOH$ is added to aluminum chloride solutions, high local solution pH results in weak gel formation. Time is required for repeptization and clearing of the solution. The higher the $R_i$, the longer the time required for clearing. Solutions with $R_i$ exceeding 2.35 generally will not clear. $R_i = 2.2$ ($NH_4OH$) solutions clear in several hours at room temperature.

Gel times can also be varied by adjusting the urea concentration. The affect of urea concentration on a 0.5M $Al^{+3}$, $R_i = 2.2$ ($NH_4OH$) system is shown by the behavior of the gel time in minutes with increasing ratios of urea to aluminum. The gel time decreases substantially logarithmically with increases in $R_u$.

A simple titration procedure was developed for determining the aluminum concentration and $R_i$ values of plugging systems such as the present system. Since the alumina colloid is stabilized at low pH by adsorbed $H^+$, gellation may be achieved by the hydrolysis of urea, producing ammonia, which increases the pH. When the molar ratio ($R$) of $NH_3$ to $Al^{+3}$ is about 2.4, the alumina colloid is destabilized and a gel is formed. Owing to the relatively slow hydrolysis of urea, excessively long gel times would result if urea were the only source of $H^+$ neutralizing base. Gel times are decreased by adding base ($NH_4OH$ or $KOH$) directly to produce an $R_i$ value (initial $R$ value) slightly less than that required for gelation, $R_i = 2.2 - 2.3$. This initial $R$ value can be determined by titrating the excess acid remaining in the system with a standard sodium hydroxide solution. Similarly, prior to the addition of base, i.e., $R_i = O$, the concentration of the aluminum can be determined by titrating the total amount of acid in the system.

In these analyses, the excess acid is titrated to the bromothymol blue indicator end point (yellow-blue) with 1.0 N NaOH. The $Al^{+3}$ concentration and $R_i$ values are then calculated using the appropriate empirically determined correction factors as follows:

$Al^{+3}$ concentration(moles/liter) $= V_t M_t/V_s C_1$
$R_i = (C_2 V_s M_s - V_t M_t)/V_s M_s$ where $V_s$ = volume $Al^{+3}$ solution
$M_s$ = $Al^{+3}$ concentration, moles/liter
$V_t$ = volume NaOH titer
$M_t$ = concentration of NaOH titer, moles/liter
$C_1 = 2.8$ (empirically determined)
$C_2 = 2.7$ (empirically determined)

The correction factors, $C_1$ and $C_2$, will vary with the indicator used. Those shown are for bromothymol blue. Although other indicators could be used with pH changes in the range pH = 5 - 9, bromothymol blue was selected as it had the easiest detected end point. The test procedures are as follows.

Aluminum concentration. (This titration must be done before any base is added to the system.)
a. Into a 100 ml beaker,
1. 5 ml $Al^{+3}$ solution
2. 35 ml distilled water
3. 1 ml bromothymol blue indicator
b. Titrate with 1.0N NaOH to light blue-green end point. When the solution gels part way through the titration, stop addition of NaOH until gel breaks then continue titration.
c. $Al^{+3}$ concentration (moles/liter) = (ml 1.0N NaOH)/14

$R_i$ Value Titration
a. Into a 100 ml beaker, add:
1. 20 ml of test solution
2. 20 ml of distilled water
3. 1 ml of bromothymol blue indicator
b. Titrate with 1.0 NaOH to light blue-green end point. Stop titration when gel forms until gel breaks
c. $R_i = [54 (M_s) - (\text{ml } 1.0N \text{ NaOH})]/20 M_s$ where $M_s$ = concentration of $Al^{+3}$ (moles/liter)

Example I: Preferred Ratio of Urea to Polyvalent Metal Salt

In a preferred procedure for achieving proper placement and distribution of formation plugging solutions, gelation should occur just as the solution has been injected to the desired distance in the formation. The solution would then be self-diverting and insure fluid placement in zones of differing permeabilities. It is anticipated that gel times in the range of 30–60 minutes will be required. It is not possible by urea hydrolysis alone to achieve 30–60 minute gel times at temperatures much below 210°F. Hydrolysis rates with reasonable urea concentrations are too slow. $R_u$ is the ratio of moles of urea to moles of $Al^{+3}$ in the gelling fluid. An $R_u = 3$ would be required for a 60-minute gel time at 200°F.

Many wells in which such a plugging system is of particular interest, have reservoir temperatures in the range of 160°–190°F, which is too low for gelation by urea hydrolysis. However, it has now been discovered that the reaction of sodium nitrite and urea will gel metal solutions, such as aluminum chloride solutions. The nitrite/urea reaction is sufficiently fast to achieve 30–60 minute gel times at temperatures as low as 130°F.

By varying the initial base ($R_b$), nitrate ($R_{NO_2^-}$) and urea ($R_u$) concentrations, it is now possible to achieve 30–60 minute gel times at temperatures down to 130°F. The practical upper temperature limit of this nitrite/urea system has not been established; but, by reducing $R_b$ and $R_{NO_2^-}$ to near zero, and thereby using urea hydrolysis for more of the base generation, it should be possible to get controlled gel times at temperatures up to about 260°F.

At relatively high temperatures, urea hydrolysis becomes a significant factor in reducing the solution gel time. However, at temperatures below 190°F the effect of urea concentration on gel time rapidly decreases. The 60-minute gel time curves ($\bar{R}_{NO_2}$ values required for gelling in 60 minutes versus temperature) for urea concentrations $R_u = 1 - 2$ converge at about 180°F. Similarly, at nitrite concentrations required to obtain 45-minute gels at 190°F ($\bar{R}_{NO_2} = 0.9 - 1.1$), urea concentrations exceeding $R_u = 1$ have little effect on gel time. However, decreasing to $R_u = 0.5$ appears to result in a relatively large decrease in gel time. These data indicate that a urea concentration of $R_u = 1.0$ would be about optimum for two reasons.

1. It is preferable to have an excess of urea in the system to assure all the acid will eventually be neutralized.
2. Increasing the urea concentration above $R_u = 1$ has little effect on gel times at temperatures less than 180°F.

Example II: Flow Rate Control

In accordance with this invention a plugging system has been designed so that an in situ self-diverting mechanism will operate as the solution is being placed in the formation. This mechanism requires that the leading edge of the injected solution gel during the placement. This will increase the injection pressure and force the remaining solution into new zones, if available. Gel times in the order of one-half to 1 hour are required.

The use of such a self-diverting mechanism makes it desirable to be able to recognize downhole conditions during placement and to take corrective action, if necessary. For example, if the injection pressure during the plugging operation is increasing so fast that all the desired fluid cannot be injected, steps should be taken to slow it down. Similarly, if plugging is not occurring fast enough, it should be speeded up.

We have found that the rate of plugging by alumina gelling solutions can be controlled by changes in the injection rate. For example, if the system is not plugging fast enough, the pumping rate can be decreased. This will cause the gel to form closer to the well bore and hence increase the plugging rate. Similarly, if the plugging is occurring too fast, this can be retarded by increasing the pumping rate. This will produce a gel at a distance further removed from the well bore and hence, will slow down the effective plugging.

Table 1 illustrates how the overall plugging can be effected by changes in flow rates. For example, in run 16 wherein the flow rate was halved soon after plugging commenced, we find that about 10 cc less fluid was required to raise the pressure drop across the pack from 10 pounds per square inch to 40 pounds per square inch. Therefore, halving the flow rate considerably enhanced the plugging per unit volume of solution employed. Similarly, in run 19, doubling the fluid flow rate considerably increased the volume of solution required to increase the pressure drop across the pack from 10 pounds per square inch to 40 pounds per square inch. This doubling of flow rate very much decreased the plugging per unit volume of solution.

Inspection of the sandpacks after these tests indicated that the effect of increasing the flow rate is to simply redissolve gel that had previously formed and displace it downstream in the sandpack. Thus, changes in flow rates during the placement of the solution can be very effective in determining how much plugging can be achieved with a given amount of solution. Since such pressure information is usually available during field injection, a control of the final injection pressure is possible using the above techniques.

TABLE 1

EFFECT OF FLOW CHANGES DURING GEL PLUGGING

Conditions:
1. No. 5 Sand – 190°F – 50 psi Back Pressure on System
2. 1 inch Diameter Pack – Fluid Flow about 0.94 cc/min with a pressure drop across the pack of 10 psi
3. Gel Solution – $AlCl_3 = 0.47M$, $R_{(NH_3)} = 2.2$, $R_{(urea)} = 2$, $R_{(oxalate)} = 0.169$

| Run | Gel Time Test Tube* (min) | Gel Time In Pack (min) | Flow** Change | Min. between 10 psi and 40 psi | cc's Gel used between 10 psi and 40 psi | % Perm. Lost After Test |
|---|---|---|---|---|---|---|
| 13 | 150 | 195 | None | 49.4 | 45.5 | 97.8 |
| 16 | 150 | 164 | Halved | 71.3 | 35.0 | 98.3 |
| 20 | 134 | 101 | None | 78.5 | 77.5 | 98.1 |
| 19 | 134 | 117 | Doubled | 81.2 | 162 | 99.96 |

$R_{(NH_3)}$ & ratio of moles $NH_3$ to moles $AlCl_3$
$R_{(urea)}$ and $R_{(oxalate)}$ & similar ratios re urea and oxalate
* Visual observation in a sealed glass tube in an oil bath at 190°F.
** Relative to the rate with 10 psi across the pack.

Example III: Initial Base Concentration

The initial base concentration ($R_b$) is an important variable influencing gel time. The $R_b$ value can be adjusted to about a maximum of 2.3 by the initial addition of base. During initial base addition, local concentration variations result in a dispersion of small gel particles. These particles must be peptized to a clear solution before the urea and nitrite are added. With initial $R_b$ values higher than 2.3, the gell dispersion will not completely peptize. Hence, $R_b$ values greater than 2.3 are preferably obtained by addition of a chemical which will increase the $R_b$ value relatively slowly without producing localized high pH and gelling. This "topping off" is readily accomplished by addition of potassium cyanate (KCNO). KCNO hydrolyzes and increases the pH by the following reaction:

$$CNO^- + 2H^+ + H_2O \rightarrow CO_2 + NH_4^+ \qquad (4)$$

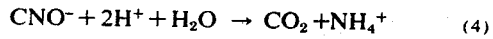

In adding KCNO, the actual increase in $R_b$ ($\Delta R_b$ yield) is about 70 percent of the KCNO added. This decrease from the estimated $\Delta R_b$ is probably the result of the $CO_2$ generated in reaction (4) forming bicarbonate by the following reaction.

$$CO_2 + H_2O = H^+ + HCO_3^- \qquad (5)$$

Example IV: Reaction of Nitrite With Ammonia

Nitrous acid reacts very fast with $NH_4^+$ ion, presumably by the following reaction:

$$8 NH_4^+ + 24 HNO_2 \rightarrow 4N_2 + 9H^+ + 24 NO + 24 H_2O \qquad (6)$$

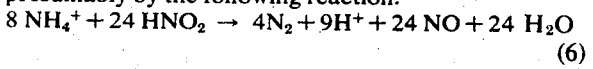

The $NH_4^+ - NO_2^-$ reaction is much too fast to be used as a means for controlling gel times in most subterranean reservoirs. As shown in Table 2, the critical gelling $NO_2^-$ concentration for a $R_b = 2.28$ $NH_4^+$ system is in the range $R_{NO_2^-} = 1.0 - 1.2$. At nitrate concentrations, $R_{NO_2^-} = 1.0$ and below, the reaction at 160°F proceeded very rapidly until the nitrite was consumed with no resulting gel formation. At nitrite concentrations of $R_{NO_2^-} \geq 1.2$, gellation occurred in less than sample heat up time which is about 5 minutes.

TABLE 2

GEL TIMES VS NO₂⁻ CONCENTRATION IN 0.5 Al⁺³, $R_{NH_4OH}$ = 2.28 SOLUTIONS

| $R_{NO_2^-}$ | 160°F Gel Time, Minutes |
|---|---|
| 0.4 | >120* |
| 1.0 | >120* |
| 1.2 | 3.3 |
| 1.4 | 2.6 |
| 1.8 | 2.3 |

* Evolved N₂ rapidly for several minutes, then reaction subsided and solution remained clear and unchanged after 2 hours.

Hence, for most well treatment operations, the nitrite-urea system is preferably restricted to KOH or NaOH systems. The nitrite-ammonia system can be used where relatively very low temperatures are involved or very fast gelations are desired.

Example V: Reaction of Nitrite With Other Materials

Table 3 summarizes several nitrite reactions which are capable of gelling aluminum solutions. In general, none of these reactions offer advantages over the nitrite/urea system and the nitrite/urea system is superior. Although nitrite/oxalate systems can be adjusted to produce 30–60 minute gels at low temperatures (160°F), the gels are weak and highly flocculated. Similarly, the reaction of nitrite and formate produced only precipitates. The reaction of nitrite and aniline produced milky yellow precipitate upon initial mixing. The reaction of nitrite and meta-phenylene diamine produced low temperature gels. However, the appearance of a small amount of dark organic crystalline material during reaction suggests that there may be a variety of side reactions which would have to be evaluated. Acetamide reacted much slower than urea and would be of no use at low temperatures. However, it may be useful at temperatures above 250°F where the rate of urea hydrolysis becomes too fast for practical gel times.

stantially uniformly within a permeable region having a non-uniform permeability, comprising:
   injecting fluid into said permeable region so that a flow stream is established between the fluid source and the most permeable zone within said region;
   including in said fluid being injected into the permeable region an aqueous solution that contains a dissolved salt of a polyvalent metal that forms a gelatinous metal hydroxide and a dissolved pH-increasing reactant containing a mixture of nitrite ions and urea; and
   correlating the composition of said aqueous solution with the temperatures in said permeable region and the location at which said solution is compounded and with the rate of said fluid injection, so that the metal hydroxide precipitation occurs within each portion of said solution within a selected relatively short time after it enters said permeable region.

2. The process of claim 1 in which said permeable region is a subterranean reservoir encountered by a well that contains means for conveying fluid to said reservoir, said reservoir has a temperature of from about 120°–190°F and said pH-increasing reactant consists essentially of a mixture of nitrite ions and urea.

3. The process of claim 1 in which said permeable region is a subterranean reservoir that has a temperature exceeding about 190°F and is encountered by a well containing means for conveying fluids to the reservoir, and said pH-increasing reactant contains a stoichiometric excess of urea and an amount of nitrite ions limited to substantially that required to increase the pH of said aqueous solution to a value that is increased to a metal hydroxide-precipitating value within a selected relatively short time by a hydrolysis of urea at a temperature exceeding about 190°F.

4. The process of claim 1 in which said metal is aluminum and said pH-increasing reactant is a mixture of urea and nitrite ions in which there is a stoichiometric excess of urea.

5. The process of claim 4 in which said aqueous solution contains an alkali cyanate as a solute that increases the initial pH of the solution.

TABLE 3

[Gelling 0.5 M Al⁺³, $R_{KOH}$ =2.3 solutions with various nitrite reactions, 160° F.]

| System | | | | Solution pH | Gel time, min. | Gel properties |
|---|---|---|---|---|---|---|
| Description | $R$Conc. | $R$NO₂⁻ | $R$Urea | | | |
| Oxalic acid | 0 | 1.0 | 2.5 | 3.90 | 170 | Weak and flocculated. |
| | 0.1 | 1.0 | 2.5 | 3.45 | 36 | Do. |
| | 0.2 | 1.0 | 2.5 | 3.35 | 17 | Do. |
| | 0.2 | 0.2 | 0 | 4.30 | >200 | Do. |
| | 0.2 | 0.4 | 0 | 4.32 | 80 | Do. |
| | 0.2 | 0.6 | 0 | 4.32 | 32 | Do. |
| | 0.1 | 0.4 | 0.5 | 3.93 | 380 | Do. |
| Potassium oxalate* | 0.1 | 0.4 | 1 | 3.95 | 225 | Do. |
| | 0.1 | 0.4 | 1.5 | 3.98 | 155 | Do. |
| | 0.2 | 0.4 | 0.5 | 4.35 | 29 | Do. |
| | 0.2 | 0.4 | 1 | 4.40 | 26 | Do. |
| | 0.2 | 0.4 | 1.5 | 4.45 | 24 | Do. |
| Sodium formate | 0.4–1.2 | 0.4–1.2 | 0 | 4.2–4.6 | | All formed ppts. |
| Aniline | 0.1–0.5 | 0.4–0.9 | 0 | 3.8–4.0 | | Formed yellow ppt. upon initial mixing, then red-brown upon heating. |
| m-Phenylene diamine | 0.4 | 0.4 | 0 | | 12 | Dark red solution upon mixing which gave brown gel on heating. |
| | | 0.8 | 0 | | 36 | |
| Acetamide | 4.6 | 0.6 | 0 | | >1,200 | Gels appeared O.K. |
| | 5.0 | 1.0 | 0 | | 844 | |
| | 5.4 | 1.4 | 0 | | 750 | |

*Oxalic acid neutralized with KOH to same pH as base solution (pH =3.98) prior to mixing.

What is claimed is:

1. A process for distributing a plugging agent sub-

6. A process for emplacing a plugging agent within a permeable region comprising:

injecting fluid into said permeable region so that a flow stream is established between the fluid source and the region;

including in said fluid being injected into the permeable region an aqueous solution that contains a dissolved salt of a polyvalent metal that forms a gelatinous metal hydroxide and a dissolved pH-increasing reactant containing a mixture of nitrite ions and urea; and correlating the composition of said aqueous solution with the temperature in the permeable region and the location at which said solution is compounded and with the rate of said fluid injection so that the metal hydroxide precipitation occurs within each portion of said solution within a selected relatively short time after it enters the permeable region.

* * * * *